United States Patent [19]
Brock et al.

[11] 3,881,190
[45] Apr. 29, 1975

[54] SHIELDED MAGNETORESISTIVE MAGNETIC TRANSDUCER AND METHOD OF MANUFACTURE THEREOF

[75] Inventors: George W. Brock, Boulder; Frank B. Shelledy, Longmont; Sidney H. Smith, Broomfield; Arthur B. Wills, Boulder, all of Colo.

[73] Assignee: International Business Machines Corporation, Armonk, N.Y.

[22] Filed: Sept. 20, 1973

[21] Appl. No.: 399,218

[52] U.S. Cl. ................ 360/113; 360/122; 360/123; 360/125
[51] Int. Cl. ........................... G11b 5/16; G11b 5/22
[58] Field of Search .......... 179/100.2 CH, 100.41 T; 324/46; 340/174 EB; 338/32 R; 360/113, 122, 123, 125, 126, 129

[56] References Cited

UNITED STATES PATENTS

| | | | |
|---|---|---|---|
| 2,712,601 | 7/1955 | Reinwald | 179/100.2 CH |
| 3,260,980 | 7/1966 | Weiss | 179/100.2 CH |
| 3,493,694 | 2/1970 | Hunt | 179/100.2 CH |
| 3,643,035 | 2/1972 | Tsukagoshi | 179/100.2 CH |
| 3,716,781 | 2/1973 | Almasi et al. | 179/100.2 CH |
| 3,731,007 | 5/1973 | Masuda et al. | 179/100.2 CH |
| R26,610 | 6/1969 | Dekoster | 179/100.2 CH |

FOREIGN PATENTS OR APPLICATIONS

| | | |
|---|---|---|
| 2,165,206 | 3/1973 | France |

*Primary Examiner*—Alfred H. Eddleman
*Attorney, Agent, or Firm*—Gunter A. Hauptman

[57] ABSTRACT

A magnetoresistive (MR) head with an unusually desirable spatial resolution includes a shield on each side of the MR element. Information is carried on a magnetizable medium as recorded magnetic areas. The shields are spaced apart by a distance on the order of and less than the shortest recorded wavelength for which the head is meant to be used. The MR element and the shields have their edges nearest the medium in a common plane perpendicular to the vertical component of a signal from the recorded area. An additional shunt bias layer may be provided immediately adjacent and coextensive the MR element, and the head may serve one or many tracks.

22 Claims, 10 Drawing Figures

SHIELDED MAGNETORESISTIVE MAGNETIC TRANSDUCER AND METHOD OF MANUFACTURE THEREOF

CROSS-REFERENCE TO RELATED APPLICATIONS

The following patent applications are incorporated herein by this reference for their disclosure:

Ser. No. 296,742, filed Oct. 11, 1972, "Internally Biased Magnetoresistive Magnetic Transducer," by G. W. Brock and F. B. Shelledy, now U.S. Pat. No. 3,813,692, and Ser. No. 296,743, filed Oct. 11, 1972, "Internally Biased Magnetoresistive Magnetic Transducer," by R. L. O'Day and F. B. Shelledy, now U.S. Pat. No. 3,814,863, both applications commonly assigned.

BACKGROUND OF THE INVENTION

1. Field of the Invention

The invention relates to magnetic transducers and more particularly to heads incorporating magnetoresistive material.

2. Description of the Prior Art

Inductive magnetic heads for recording and reading information on magnetic media are not commercially applicable to many recent problems. For, example, information magnetically encoded on consumer containers must be read into computers by an inexpensive and rugged transducer under extreme environmental conditions. Inductive magnetic heads, which convert flux changes to electric signals, require a relatively constant head-media relative velocity not possible with a head held in the hand of a store clerk. The manufacturing cost of inductive heads also precludes their use where damage and theft are likely.

Solutions to both the problems of constant relative motion and manufacturing expense have been promised by using well known devices sensitive to magnetic flux ($\Phi$) as opposed to the rate of flux change $d\Phi/dt$. Such devices will read magnetic information regardless of the consistency of relative mediahead motion and also promise manufacturing economies because they are amenable to batch fabrication techniques. In the Hall effect, a magnetic field causes a potential to appear across a material as a function of the field's flux density B (B being a function of $\Phi$). Heads using the Hall effect theoretically solve the constant relative motion problem but, nevertheless as a practical matter, remain difficult and expensive to construct due to noise problems, frequency limits and complex biasing techniques. A typical head using the Hall effect is described in U.S. Pat. No. 3,355,727 to Gaubatz, filed July 24, 1963.

A more promising approach to solving the difficulties inherent in conventional inductive heads is use of the magnetoresistive (MR) effect as disclosed in U.S. Pat. No. 3,493,694 of R. P. Hunt, "Magnetoresistive Head," filed Jan. 19, 1966, and in an article entitled "A Magnetoresistive Readout Transducer" by R. P. Hunt published in IEEE TRANSACTIONS ON MAGNETICS, Vol. MAG-7, No. 1, March, 1971, pages 150–154. Hunt discloses an MR read head which is both inexpensive to fabricate and insensitive to the rate at which a recorded field is scanned by the head. Hunt's MR head includes a thin, narrow strip of ferromagnetic metallic material of low anisotropy, such as Permalloy, having a width of the order of 1 mil (1,000 microinches) and a thickness of the order of 600 A (2.4 microinches). In one embodiment, Hunt's MR element is mounted with its "width" (the more common name "throat height" will be used herein for vertical elements) vertical to and immediately adjacent the media in a support which serves as a support as well as a field concentrator and shield. The support appears on only one side of the MR element, though it is possible to infer that the support continues around the MR element, as will be discussed below. Bias, which is essential to the operation of an MR element, is, in this embodiment, supplied by a movable permanent magnet. Hunt states that as the wavelength of the recorded field approaches the height of the MR element, the output signal falls off rapidly. Hunt states that it is apparent that a head of superior qualitites would result by halving the MR element height to 0.5 mil (500 microinches).

Thus, while Hunt discloses a vastly improved magnetic head, two significant problems remain: (1) a separate magnetic bias must somehow be supplied to the MR element, and (2) the MR element height must be very short to give a usable output signal at high linear densities. Both problems directly affect the usability and manufacturing expense of a commercial head. Approaches to solving the bias problem appear in the referenced Brock et al and O'Day et al applications. There, bias is supplied by permitting the current normally flowing through the MR element to also flow through a shunt element in contact with the MR element. This simplifies fabrication and produces a unitary device incorporating magnetic bias as an integral part of its structure. However, nowhere in the prior art is there any suggestion of how to eliminate the expense and difficulty of making the very short MR element which Hunt states is necessary for a useful signal output.

While Hunt does not suggest that an MR element be surrounded by a support, the presence of a U-shaped support can be inferred from Hunt's FIG. 2 and the spacing between its inner surfaces hypothesized. A hypothetical spacing can be approximately calculated inasmuch as an MR element of known thickness is deposited on a glass substrate of presumably known standard, commercially available thickness, of no more than 40 mils (40,000 microinches). Assuming that a 600 A MR element is sandwiched between two glass layers, the spacing would, therefore, be about 80 mils (80,000 microinches or 20,000,000 A). This spacing is so large that it can in effect be ignored and the MR element may be analyzed as though it were positioned in free space above a magnetic medium. In such a case, the Hunt head will have a relatively poor spatial resolution; that is, its output amplitude (resulting from a varying current generally proportional to its resistance variations as a function of flux values sensed) will differ widely for differing recorded signal wavelengths.

The height of the MR element is a major variable in determining the spatial resolution. As the wavelength decreases, less of the MR element is intercepted by flux lines from the medium. Thus, for decreasing wavelength, the ratio of resistance change ΔR (and, therefore, the output amplitude's dynamic range) relative to the total resistance R of the MR element approaches zero. While this indicates that, as recognized by Hunt, reducing the MR element height (and thus R) will improve performance, sufficient reduction is impossible on a reasonable commercial basis due to fabrication problems. For example, it would be reasonable to expect that a head similar to that disclosed in the Hunt patent would be limited to a wavelength longer than 1,000 microinches. The practical usefulness of the head is, therefore, vastly reduced.

Another approach to the general problem, using MR elements, is described in D. A. Thompson's copending application entitled "Magnetic Recording Head" (Ser. No. 212,591) filed Dec. 27, 1971, now abandoned. Here the MR element is placed away from the immediate vicinity of the medium to give enhanced performance.

The inductive head art, on the other hand, suggests no solutions to the problem; for example, it is well known that inductive head performance is degraded as the gap length becomes long relative to the wavelength of the recorded signal. Thus, for a given gap in an inductive head, the amplitude of the recorded signal is reduced for shorter recorded wavelengths. This is explained in *Magnetic Recording Techniques* by W. Earl Stewart (McGraw-Hill, 1958), Chapter 3. Utilizing the analysis therein, a practical conservatively designed inductive head would have a gap which is about 50% but usually closer to 25% of the recorded wavelength. Extending the conventional analysis of gaps from inductive to MR heads of the type disclosed in the Hunt patent is not possible due to the basic structural and theoretical differences between inductive (ring) and MR heads. While these differences are well known and widely published, the ones most relevant to this discussion are summarized as:

1. An inductive head senses the horizontal component of the recorded signal whereas an MR head senses the vertical.
2. In an inductive head, a closed path for horizontal components of flux from the medium must be provided through magnetically permeable poles. On the other hand, an MR element does not require any poles whatsoever to sense the vertical component of flux.
3. The concept of pole gap in an inductive head has no analogy in a poleless MR head.

SUMMARY OF THE INVENTION

Applicants have discovered that an MR head with a desirably tall MR element is possible if the element is very closely sandwiched between two magnetically permeable shields. An edge of each shield and the MR element lie in a single plane adjacent the medium. The inner edges of the shields are separated by a distance that is less than the minimum recorded signal wavelength. The MR element may be centered in the space between the shields, and it is not necessary that the shields be connected. Tests show that such a configuration gives an essentially constant output amplitude over a reasonable range of recorded signal wavelengths, whereas the same element height gives an undesirably large amplitude change over the same range if no shields are used. Further tests have shown that increased MR element height does not greatly affect the head spatial resolution if the spacing between the shields is on the order of, but less than, the shortest recorded wavelength. It is believed that the closely spaced shields mask out essentially all flux not associated with a single recorded flux transition. Disregarding other known losses, this masking provides approximately the same amount of flux for all wavelengths, practically eliminating the situation where short wavelength signals provide flux to only a small portion of the element, and long wavelengths in effect "saturate" the MR element.

The taller MR element for the first time makes large-scale production feasible by eliminating a difficult to monitor dimensional tolerance. Illustrative shield spacings have been found to be 30 microinches, 40 microinches, 70 microinches and 120 microinches for recorded signals having minimum wavelengths of 50 microinches, 133 microinches, 220 microinches and 313 microinches, respectively. In addition, the invention achieves close shield spacing by eliminating a separate passive MR substrate in favor of an active shunt bias layer as described in the cross-referenced Brock et al and O'Day et al applications.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

General Description

FIGS. 1*a*–1*d* illustrate one theory underlying operation of prior art magnetoresistive devices.

Figure 1A:
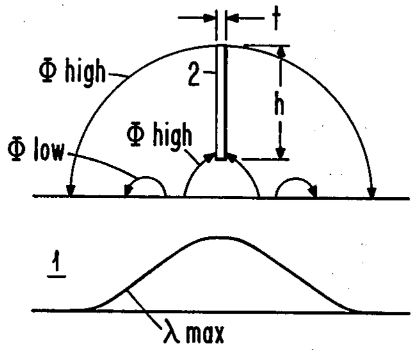
FIG. 1a PRIOR ART
FIGS. 1*a*–1*d* illustrate flux present in various prior art magnetoresistive heads.
Figure 1B:
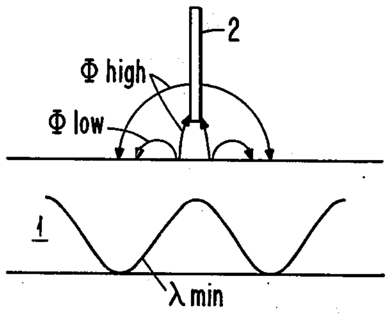
FIG. 1b PRIOR ART
Figure 1C:
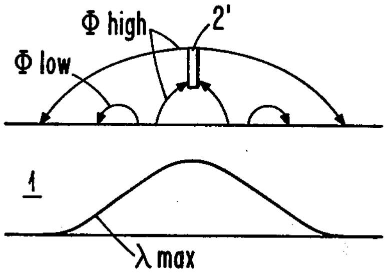
FIG. 1c PRIOR ART
Figure 1D:
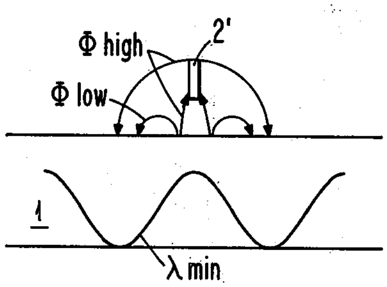
FIG. 1d PRIOR ART
Figure 6:
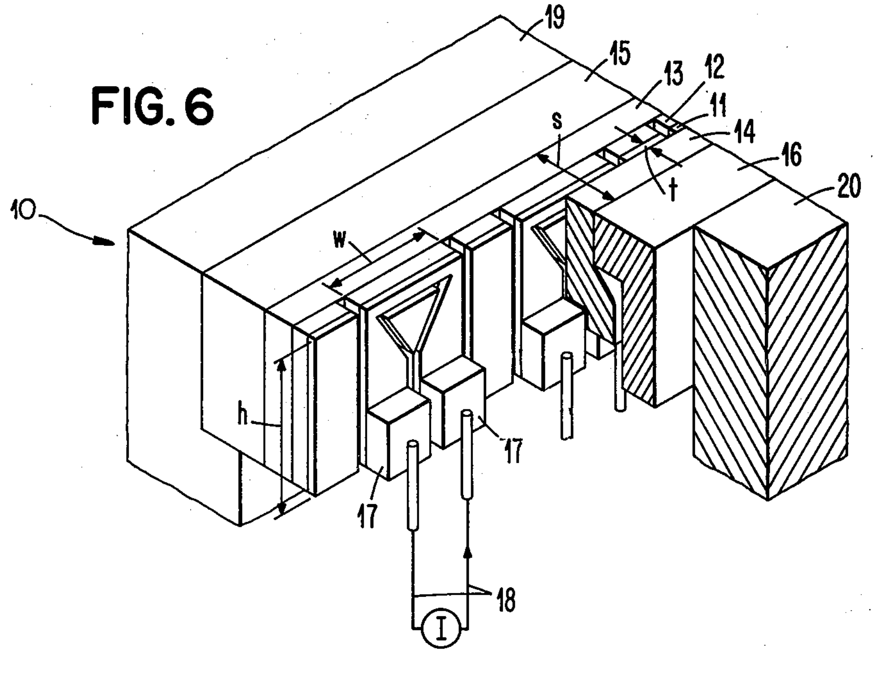
FIG. 6 is a three-dimensional cross-sectional view of a multitrack head incorporating the invention.

Referring to FIGS. 1*a* and 1*b*, a magnetic medium 1 carries idealized recorded signals with a wavelength $\lambda$ ranging from an arbitrary "minimum" wavelength $\lambda min$ to an arbitrary "maximum" wavelength $\lambda max$ supplying flux $\Phi$ to a magnetoresistive (MR) element 2. The wavelength $\lambda min$ is typically on the order of 1,000 to less than 50 microinches. $\lambda max$, depending upon the recording density and recording code, can be almost any length approaching infinity (for example, in a NRZI recording with a long run of zeroes). $\lambda max$ can be limited to a reasonable value such as a few times $\lambda min$ by the choice of an appropriate run-length limited code. As is well known, the MR element 2 has a nominal resistance R which changes an amount $\pm\Delta R$ as a function of the magnetic flux $\Phi$ to which it is exposed. Only the maximum wavelength $\lambda max$ and the corresponding flux lines are shown in FIG. 1*a*, while FIG. 1*b* shows only the minimum wavelength $\lambda min$ and the flux lines corresponding thereto. In each case there is a low value of flux $\Phi low$ close to the inflection point of the recorded signal and a higher flux value $\Phi high$ corresponding to points nearer the signal peaks. Intermediate cases are omitted for simplicity. The MR element has a throat height ("width" in the prior art Hunt patent) *h* and thickness *t*. FIGS. 1*a* and 1*b* illustrate that if the height $h$ is chosen to pass Φhigh through the entire MR element at λmax in FIG. 1*a*, only a portion of the MR element will be used at λmin as shown in FIG. 1*b*. This is undesirable because the amount of resistive change ΔR in the element 2 becomes smaller and thus a more difficult to detect. On the other hand, the problem is not completely solved by shortening the height $h$ to give satisfactory response at λmin as shown in FIG. 1*d* because, then, the shortened MR element 2′ will be subject to a "demagnetizing effect" described in the referenced Hunt article which reduces the head's output. While this can be compensated for by decreasing the MR element thickness $t$, the flux density B (which equals $\Phi/(w \times t)$) for long wavelengths will become so large that the MR element "saturates". This occurs because, as is well known, the amount of flux available to the MR element increases with wavelength. The dimensions $w$ and $t$ are shown in FIG. 6.

Figure 2A:
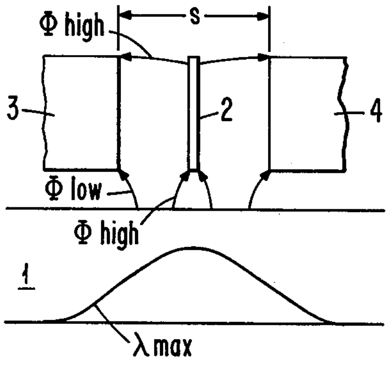
FIGS. 2*a*–2*b* illustrate flux present in magnetoresistive heads incorporating the invention.
Figure 2B:
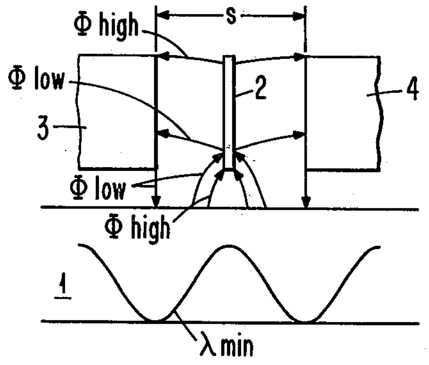
Figure 3:
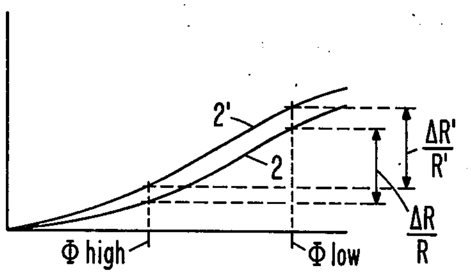
FIG. 3 is a graph showing resistance ratios as a function of flux in heads in FIGS. 1*a*–2*b*.

FIGS. 2*a*, 2*b* and 3 illustrate a theory underlying the operation of magnetoresistive heads incorporating the invention herein. Two shields 3 and 4 are spaced a distance $s$ apart and either equidistant or asymmetric to the element 2. If the distance $s$ is much less than the wavelength, for example λmax as shown in FIG. 2*a*, the "saturation" just described does not occur even if the element 2 is thinner. The reason is believed to be a masking effect wherein the shields 3 and 4 divert away flux lines Φlow, due to lower signal amplitudes, and pass only those flux lines Φhigh due to higher signal amplitudes. As shown in FIG. 3, the ratios of resistance change to resistance for a given Φmin and Φmax are almost the same for both a long element 2 and a short element 2′. Referring to FIG. 2*b*, the same configuration operates as well at the shorter wavelength λmin regardless of which MR element 2 or 2′ is used.

Figure 4:
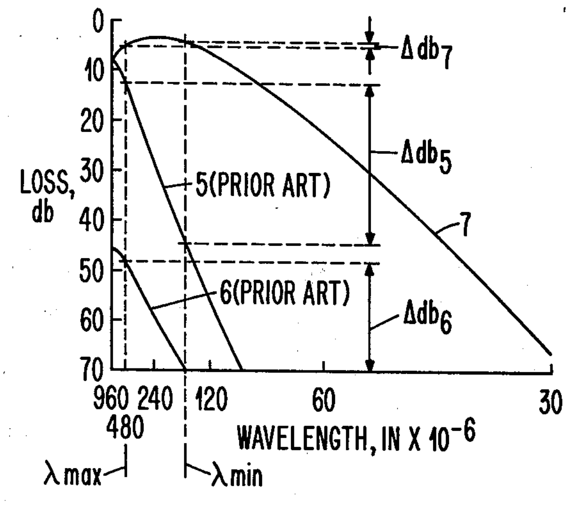
FIG. 4 shows the spatial resolution of heads in FIGS. 1*a*–2*b*.

Referring now to FIG. 4, the spatial resolution of various MR heads is shown for comparison. The output signal (measured in db loss for convenience) is a function of the change in Mr element resistance ΔR for a given range of recorded signal wavelengths λmin to λmax. Quite different outputs occur from prior art heads (curves 5 and 6) as opposed to a head incorporating the invention (curve 7). Curve 5 is plotted for a head of the type outlined in FIGS. 1*a* and 1*b* having a throat height $h$ of 600 microinches. Reducing the height $h$ to 60 microinches desirably reduces the range of amplitude variation Δdb for any given λmin and λmax. Such a head is described in FIGS. 1*c* and 1*d* and by response curve 6 of FIG. 4. However, it is also apparent from curve 6 that the amplitude becomes undesirably small (db loss increases) for short wavelengths, close to λmin. Curve 7, the spatial resolution curve for the head of FIGS. 2*a* and 2*b* incorporating the invention, exhibits none of the problems evident from curves 5 and 6. Such a head includes an MR element height $h$ of 600 microinches and two shields spaced at a distance of 40 microinches. Over the entire range λmin to λmax, the output amplitude varies by only a few db. At a λmin of 60 microinches, the amplitude differs only about 15 db (due to known media losses) from the amplitude to λmax, yet the MR element height is the same as for the head represented by curve 5.

Figure 5:
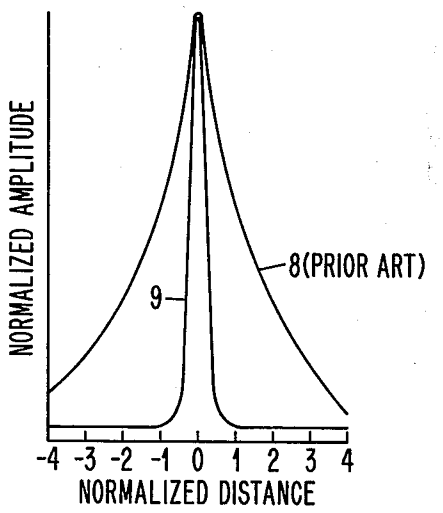
FIG. 5 shows amplitude characteristics of heads in FIGS. 1*a*–2*b*.

The masking effect of the shields 3 and 4 is compared with unshielded MR elements in FIG. 5. If the amplitude resulting from different portions of a recorded flux transition in a medium under an MR element, as shown in any of FIGS. 1*a*–2*b*, is plotted, curves like 8 and 9 result. The ordinate axis represents any relative, normalized, non-logarithmic signal amplitude value and the abscissa represents a position along the medium 1. The values can be obtained by measuring the output of an MR element 2 or 2′ while moving either the medium or the element. A prior art arrangement of the type shown in FIGS. 1*a*–1*b* gives a wide curve 8, whereas a shielded head incorporating the invention, as in FIGS. 2*a*–2*b*, gives a very narrow curve 9. The narrow curve 9 illustrates what is believed to be a masking of undesired portions of the recorded signal responsible for the unexpectedly deisrable spatial resolution curve 7 in FIG. 4.

It has been established that a shielded MR element gives superior performance to an unshielded element. The shields should be spaced apart on the order of, and less than, the shortest recorded signal wavelength. The edges of the MR element and shields closest to the medium should lie in a single plane parallel to the medium or (where the medium is not flat) perpendicular to the vertical magnetic field component. Applicants herein have found that such a configuration permits use of an MR element with a taller throat height $h$ than previously possible, giving better control of grinding, lapping and other manufacturing operations which are extremely difficult to perform on narrow elements. The manufacturing problems are explained in copending application "Apparatus for Batch-Fabricating Magnetic Film Heads and Method Therefor" by C. D. Abbott, G. W. Brock, N. L. Robinson, F. B. Shelledy, and S. H. Smith, filed Oct. 11, 1972, Ser. No. 296,688, assigned to International Business Machines Corporation. Also, tall throat height, and the resulting decreased insensitivity to throat height, gives less change in head characteristics as it wears in use.

The medium referred to herein may be any material capable of retaining information such as bits as magnetized areas. These areas may be considered discrete, defining a wavelength by the distance between the beginning of successive areas. Typically, these areas are grouped together at recording densities of 100 to 50,000 bits per inch. By "plane" is meant one defined as in plane geometry or one on the surface of a sphere as defined in spherical geometry.

DETAILED DESCRIPTION

Referring now to FIG. 6, a shunt bias MR element of the type described in the referenced O'Day et al and Brock et al applications is sandwiched between appropriately coated ferrite enclosures separated by distances $s$ to form a head 10. While shunt bias technique facilitates the fabrication of such a head (by removing the need for complicated external or other biasing techniques), and particularly one with a small dimension $s$, the scope of the invention is not meant to be limited to shunt bias heads. Head 10 is intended for reading only but may be easily modified for writing as well as reading in accordance with the description in the IBM TECHNICAL DISCLOSURE BULLETIN article entitled "Magnetoresistive Read/Write Head" by G. W. Brock; F. B. Shelledy and L. Viele, (dated Sept. 1972, and distributed after Sept. 29, 1972) pages 1,206–1,207. Any number of elements, each used for a single track, may be supplied.

An MR layer 11 of material (such as NiFe) exhibiting the magnetoresistive effect is deposited on a shunt layer 12 composed of an appropriate material (such as Ti) which generates a bias field intercepting the MR layer 11 when electric current from source I, supplied to conductive (for example, copper) leads 18, passes through both the MR layer 11 and shunt layer 12 via conductive (in the example, copper) pads 17. For illustration, the MR layer may consist of 1.2 microinches (300 A) of Permalloy and the shunt layer 5.4 microinches (1,350 A) of Titanium deposited, masked and etched by conventional means. The shunt layer 12 also provides an adhesive layer for joining the MR layer 11 to a 15-microinch (3,750 A) insulating layer 13 (such as $Al_2O_3$) previously deposited on one side of a shield 15. The shield may be any magnetically permeable material, such as Permalloy. If desired, more than one MR layer and shunt bias layer combination may be provided, each shunt bias layer may be placed between two MR layers, an MR layer may be placed between two shunt bias layers, two MR layers may bias each other, or any of the foregoing may be combined. One such alternative appears in an IBM TECHNICAL DISCLOSURE BULLETIN article entitled "Balanced Magnetic Head" by R. L. O'Day, Feb. 1973, page 2680. The triangular section (including layer 11) is optional. Another 35 microinch (8,750 A) insulating layer 14 and another shield 16 complete the assembly. The top edges of layers 11 and 12 are in the same plane as the top edge of ferrite shields 15, 16 and are, therefore, subject to smearing and errosion during both manufacture and use of the head 10. Thus, limiting the use of soft materials such as Permalloy and Titanium to these very thin layers enhances the manufacturability and life of the head. The throat height *h* of the layers 11 and 12 is not, as it was in the prior art, critical to the resolution of the head but should, for efficiency, be limited to about 10 times the spacing *s* between shields 15 and 16. The above dimensions give a total spacing *s* of 56.6 microinches (14,650 A). Additional similar heads have been constructed with spacings of 70 microinches (17,500 A), 40 microinches (10,000 A), 30 microinches (7,500 A) and 120 microinches (30,000 A). The entire assembly is clamped in housing plates 19 and 20 by bolts or the like and machined to form a desired surface contour. An illustrative method of manufacturing the head of FIG. 6 follows:

1. One surface of ferrite shield 15 is polished flat and cleaned.
2. An $Al_2O_3$ layer 13 is deposited on the prepared surface of shield 15 to a depth of 3,750 A (15 microinches).
3. A Titanium layer 12 is deposited on the $Al_2O_3$ layer 13 to a depth 1,350 A (5.4 microinches).
4. A Permalloy (83% Nickel, 17% Iron) layer 11 is deposited on the Titanium layer 12 to a depth of 300 A (1.2 microinches) in a magnetic field which aligns the domains perpendicular to the throat height.
5. A relatively thick mechanical bar mask (not shown) of any appropriate material, such as stainless steel, defining the throat dimension, is placed on the Permalloy layer 11 to temporarily protect the top portion of the Permalloy layer.
6. A copper layer (including pads 17) is deposited to a depth of 5,000 A (20 microinches) on the bar mask and the exposed portion of the Permalloy layer 11.
7. A mask (not shown) is placed over the copper layer, as deposited in Step 6, to define copper pads 17 and the spaces between and within the head elements in FIG. 6, and an etchant is applied.
8. The mask is removed.
9. The incomplete head is tested by sensing the current induced in the individual elements when it is placed in an inductive field.
10. A layer of $Al_2O_3$ is deposited on the entire surface exposed after Step 8 to a depth of 8,750 A (35 microinches).
11. A mask (not shown) is placed over the $Al_2O_3$ layer, exposing an area over the copper lands 17, and an etchant is applied.
12. The mask is removed.
13. Wire leads 18 are connected to the exposed areas of the lands 17.
14. A second ferrite shield 16 has a polished and cleaned surface mated with the completed subassembly as shown in FIG. 6.
15. Housings 19 and 20 are clamped about the shields 15 and 16.
16. The top surface of the completed subassembly and housing is ground and polished to a desired contour.

It will be understood that the sequence of steps above may be reversed to utilize shield 16 in Step 1 instead of shield 15, the relative positions of the adjacent layers 11 and 12 being irrelevant. The layer thicknesses also may be adjusted to place the Permalloy layer in a position asymmetric to the shields.

While the invention has been particularly shown and described with reference to preferred embodiments thereof, it will be understood by those skilled in the art that various changes in form and details may be made therein without departing from the spirit and scope of the invention.

What is claimed is:

1. A magnetic head for interacting with multiwavelength information recorded as magnetized areas spaced along a recording medium, including:

a pair of magnetically permeable members having opposing faces spaced apart a fixed distance, on the order of and less than the shortest wavelength of the recorded information, the edge of each of the two members closest to the medium lying in the same plane; and a transducing element, including a number of layers of material exhibiting the magnetoresistive effect disposed between the magnetically permeable members and having the edge closest to the medium lying in aforesaid plane.

2. The head of claim 1 wherein at least one magnetoresistive layer is juxtaposed with a layer of relatively conductive material.

3. A magnetic transducer for reading the vertical component of data having a plurality of wavelengths recorded as magnetized areas on a magnetic medium comprising:

two spaced-apart shields each having an end coplanar with the other and defining a space therebetween, said space having one dimension less than the shortest wavelength of the electric signals; and at least one magnetoresistive element disposed in said spacing having one edge coplanar with the shield ends.

4. The transducer of claim 3, additionally comprising:

at least one shunt bias element disposed in such space and in contact with at least one magnetoresistive element; and nonconductive and nonmagnetic insulating material disposed in said space between one shield and the magnetoresistive element.

5. A head for transducing electrical signals and the vertical component of magnetic fields from discrete areas of a medium, wherein the physical spacings of the recording on the medium and the electrical signal wavelength are related, comprising:

a first shield in flux-coupling relationship with at least one magnetic field at a time, having one end in a plane perpendicular to the vertical component of said magnetic field;

a second shield in flux-coupling relationship to aforesaid vertical component and having one end in said plane; and a plurality of layers of materials interposed between said first and second shields having one end in said plane and a thickness on the order of, and less than, the shortest signal wavelength.

6. The head of claim 5 wherein:

said materials including at least a layer of magnetoresistive material and a juxtaposed layer of relatively conductive constant resistance material; and a source of electric current connected to selected ones of said layers.

7. In combination:

a magnetic medium carrying areas of magnetic recordings representing data recorded by signals having a range of wavelengths;

a number of member pairs of shielding material, each pair in flux-coupling relationship with one of said areas at a time;

filling material, responsive to the vertical field component of the magnetic recordings, disposed between each pair of members and separating said members by a distance equal to and less than the minimum of said range of wavelengths;

a surface contour including one end of each of said member pairs and the filling material; and means for coupling electric current to said gap filling material.

8. The combination of claim 7 wherein the filling material includes magnetoresistive material and adjacent shunt biasing material.

9. The combination of claim 7 wherein the shielding material is a magnetically permeable material selected from the class of materials including ferrite.

10. A magnetic head for transducing magnetically recorded signals having a selected range of wavelengths and related spacing, comprising:

a first shield having an inner face;

an insulating material of a first thickness adjacent the inner face of said first shield;

a constant resistance material of a second thickness adjacent the insulating material on the side opposite said first shield;

a variable resistance material of a third thickness adjacent the constant resistance material on the side opposite the insulating material;

conductive material adjacent portions of the variable resistance material on the side opposite the constant resistance material;

additional insulating material of a fourth thickness, which may equal the first thickness, adjacent the variable resistance and conductive material on the sides opposite the constant resistance material;

a second shield having an inner face adjacent the additional insulating material and spaced from the first ferrite material by the four thicknesses a distance less than the shortest wavelength in said range of wavelengths;

a housing surrounding the first and second shields and maintaining a retaining force thereon;

a surface contour common to aforesaid shields, insulating, constant resistance material, variable resistance material and said housing including an edge of each of the aforesaid; and a source of current connected to said conductive material.

11. The magnetic head of claim 10 wherein the spacing between the first and second ferrite materials is on the order of 30% to 40% of the spacing between the magnetically recorded signals.

12. A method for making a magnetic head for transducing magnetically recorded signals having a selected range of wavelengths and related spacing including the steps of:

A. providing a first shield having an inner face;

B. placing an insulating material of a first thickness adjacent the inner face of said first shield;

C. depositing in any order:

1. a constant resistance material of a second thickness;
2. a variable resistance material of a third thickness;

D. providing a second shield spaced from the first shield a distance less than the shortest wavelength in said range of wavelengths;

E. surrounding the first and second shields with a housing and maintaining a retaining force thereon;

F. forming a surface contour common to aforesaid shields, insulating, constant resistance material, variable resistance material and said housing including an edge of each of the aforesaid; and G. connecting a source of current to said deposited material.

13. The method of claim 12 wherein there are provided the following additional steps of placing:

conductive material adjacent portions of the variable resistance material; and additional insulating material of a fourth thickness, which may equal the first thickness, adjacent the second shield on the side facing the first shield.

14. The method of claim 13 wherein the first and second shields are spaced apart on the order of 30% to 40% of the spacing between the magnetically recorded signals.

15. A magnetic head for interacting with multiwavelength information recorded as magnetized areas spaced along a recording medium at first distances on the order of 1,000 to less than 50 microinches, including:

a pair of magnetically permeable members having opposing faces spaced a fixed second distance apart and the edge of each of the two members closest to the medium lying in the same plane, which second distance is on the order of and less than said first distances; and a transducing element, including a number of layers of material exhibiting the magnetoresistive effect disposed between the magnetically permeable members and having the edge closest to the medium lying in aforesaid plane.

16. The head of claim 15 wherein at least one magnetoresistive layer is juxtaposed with a layer of relatively conductive material.

17. A magnetic transducer for reading the vertical component of data having a plurality of wavelengths, generally in the range of about 1,000 to less than 50 microinches, recorded as magnetized areas on a magnetic medium comprising:

two spaced-apart shields each having an end coplanar with the other and defining a space therebetween, said space having one dimension less than the shortest wavelength of the electric signals; and at least one magnetoresistive element disposed in said spacing having one edge coplanar with the shield ends.

18. The transducer of claim 17, additionally comprising:

at least one shunt bias element disposed in such space and in contact with at least one magnetoresistive element; and nonconductive and nonmagnetic insulating material disposed in said space between one shield and the magnetoresistive element.

19. The transducer of claim 18 wherein the thickness of the magnetoresistive element is on the order of about 1 microinch.

20. The transducer of claim 18 wherein the height of the magnetoresistive element is on the order of about 300 microinches.

21. The transducer of claim 19 wherein the height of the magnetoresistive element is on the order of about 300 microinches.

22. A magnetic head for transducing magnetically recorded signals having a selected range of wavelengths and related spacing both on the order of from about 1,000 to less than 50 microinches, comprising:

a first shield having an inner face;

an insulating material of a first thickness adjacent the inner face of said first shield;

a constant resistance material of a second thickness adjacent the insulating material on the side opposite said first shield;

a variable resistance material of a third thickness adjacent the constant resistance material on the side opposite the insulating material having a thickness of less than about 2 microinches and a height of about 300 to 600 microinches;

conductive material adjacent portions of the variable resistance material on the side opposite the constant resistance material;

additional insulating material of a fourth thickness, which may equal the first thickness, adjacent the variable resistance and conductive material on the sides opposite the constant resistance material;

a second shield having an inner face adjacent the additional insulating material and spaced from the first ferrite material by the four thicknesses a distance on the order of 30% to 40% of the shortest wavelength in said range of wavelengths;

a housing surrounding the first and second shields and maintaining a retaining force thereon;

a surface contour common to aforesaid shields, insulating, constant resistance material, variable resistance material and said housing including an edge of each of the aforesaid; and a source of current connected to said conductive material.

* * * * *